United States Patent [19]

Amdhal et al.

[11] 3,803,392

[45] Apr. 9, 1974

[54] CODE CONVERTER AND METHOD FOR A DATA PROCESSING SYSTEM

[75] Inventors: Gene M. Amdhal, Saratoga; Michael R. Clements, Santa Clara, both of Calif.

[73] Assignee: Amdahl Corporation, Sunnydale, Calif.

[22] Filed: Oct. 30, 1972

[21] Appl. No.: 302,224

[52] U.S. Cl. .................. 235/155
[51] Int. Cl. .................. H03k 13/24
[58] Field of Search .......... 340/172.5; 235/154, 155

*Primary Examiner*—Thomas A. Robinson
*Attorney, Agent, or Firm*—Flehr, Hohbach, Test, Albritton & Herbert

[57] ABSTRACT

Disclosed is a method and apparatus for converting numbers in one base system to equivalent numbers in another base system. In one example, a binary number N*x* is converted to a binary-coded-decimal (BCD) equivalent B*z*. The method and apparatus employ a multiplier within the execution unit of the data processing system. The steps performed include first multiplying the binary number N*x* which is within the range 0 to 10Y, by a binary factor approximately equal to $10^{-Y}$ to form a first product $Bz(0)\cdot Yx(0)$. Thereafter, Yx(0) is multiplied by binary $10^{+1}$ to form the product $Bz(1)\cdot Yx(1)$. The iteration continues with each term $Yx(i)$ multiplied by binary $10^{+1}$ to form each new product $Bz(i+1)\cdot Yx(i+1)$ where the desired *BCD* number is $Bz(0)$, $Bz(1)$, . . . , $Bz(i)$, $Bz(i+1)$, . . . , $Bz(n-1)$.

4 Claims, 3 Drawing Figures

CODE CONVERTER AND METHOD FOR A DATA PROCESSING SYSTEM

CROSS REFERENCE TO RELATED APPLICATIONS

1. DATA PROCESSING SYSTEM, Ser. No. 302,221, filed Oct. 30, 1972, (A-27837), invented by Gene M. Amdahl et al., assigned to Amdahl Corporation.

BACKGROUND OF THE INVENTION

The present invention relates to the field of data processing systems and specifically to the field of methods and apparatus for converting numbers in one code to numbers in a different code.

Prior art data processing systems usually include, within their instruction set, instructions which require information to be coded differently from the code employed internally within the data processing system. High speed data processing systems typically employ binary codes for internal processing while encoding and decoding from the binary code in order to communicate with I/O devices.

Some prior art methods and apparatus for executing conversions from one code to another have employed combinations of adders and other functional units rather than employing a single dedicated conversion apparatus. While conversion devices or algorithms employing adders and other functional units have been successfully employed, it is desirable to employ methods and apparatus which make use of high speed multipliers.

SUMMARY OF THE INVENTION

The present invention is a method and apparatus for converting numbers in one code to numbers in a different code in a data processing system.

Numbers Nx to the base $x$ are converted to equivalent numbers Bz to the base $z$. Nx is included in the range between 0 and $^{+v}$. Each number Bz includes the digits Bz(0), Bz(1) , . . . Bz(i), Bz($i$+1) , . . . , Bz($n$−1) .

The conversion from Nx to Bz is carried out by the initial step of multiplying Nx by $z^{-v}$ to form the product Bz(0)·Yx(0). The truncated product term $Yx(0)$ is multiplied by $z^{+1}$ to form the product Bz(1)·$Yx$(1). Thereafter, each term $Yx(i)$ is multiplied by $z^{+1}$ to form each new product $Bz(i+1)\cdot Yx(i+1)$.

In a specific example of the present invention, the data processing system is binary and therefore $x$ equals 2 and the conversion is to binary-coded-decimal and therefore $z$ equals 10.

The present invention achieves the object of converting one number system (e.g. binary) to another number system (e.g. BCD) employing an iterative process of multiplication within the data processing system.

Additional objects and features of the invention will appear from the following description in which the preferred embodiments of the invention have been set forth in detail in conjunction with the drawings.

OVERALL SYSTEM

Figure 1:
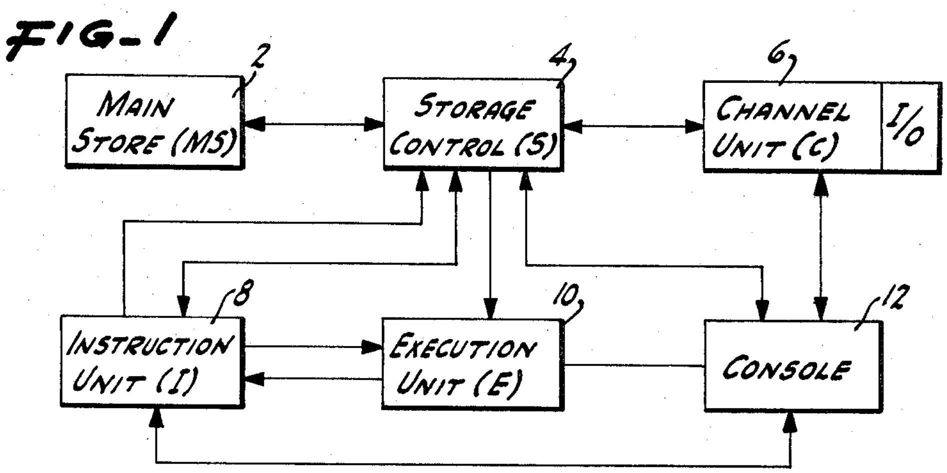
FIG. 1 depicts a block diagram of a basic environmental system suitable for employing the conversion method and apparatus of the present invention.
Figure 2:
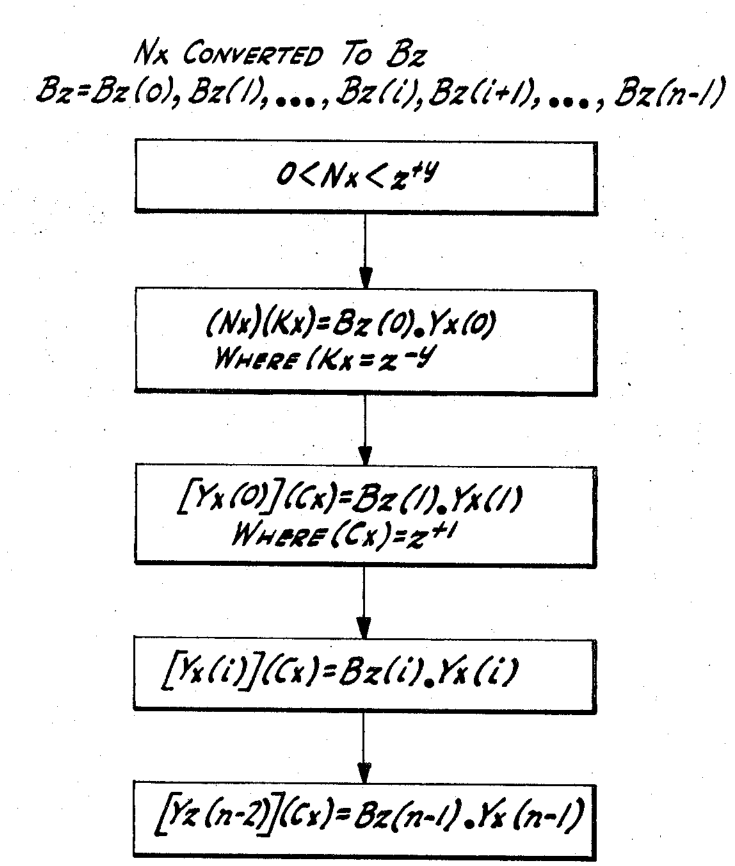
FIG. 2 depicts a flow chart of the method and steps of the present invention.

In FIG. 1, a basic environmental processing system is shown which is suitable for employing the conversion method and apparatus of the present invention. Briefly, that system includes a main store 2, a storage control unit 4, an instruction unit 8, an execution unit 10, a channel unit 6 with associated I/0, and a console 12. In accordance with well known principles, the data processing system of FIG. 1 operates under control of a stored program of instructions. Typically, instructions and the data upon which the instructions operate are introduced from the I/O equipment via the channel unit 6 through the storage control unit 4 into the main store 2. From the main store 2, instructions are fetched by the instruction unit 8 through the storage control 4, and are decoded to control the execution of instructions. Execution unit 10 executes instructions decoded in the instruction unit 8 and operates upon data communicated to the execution unit from the appropriate places in the system.

EXECUTION UNIT

Figure 3:
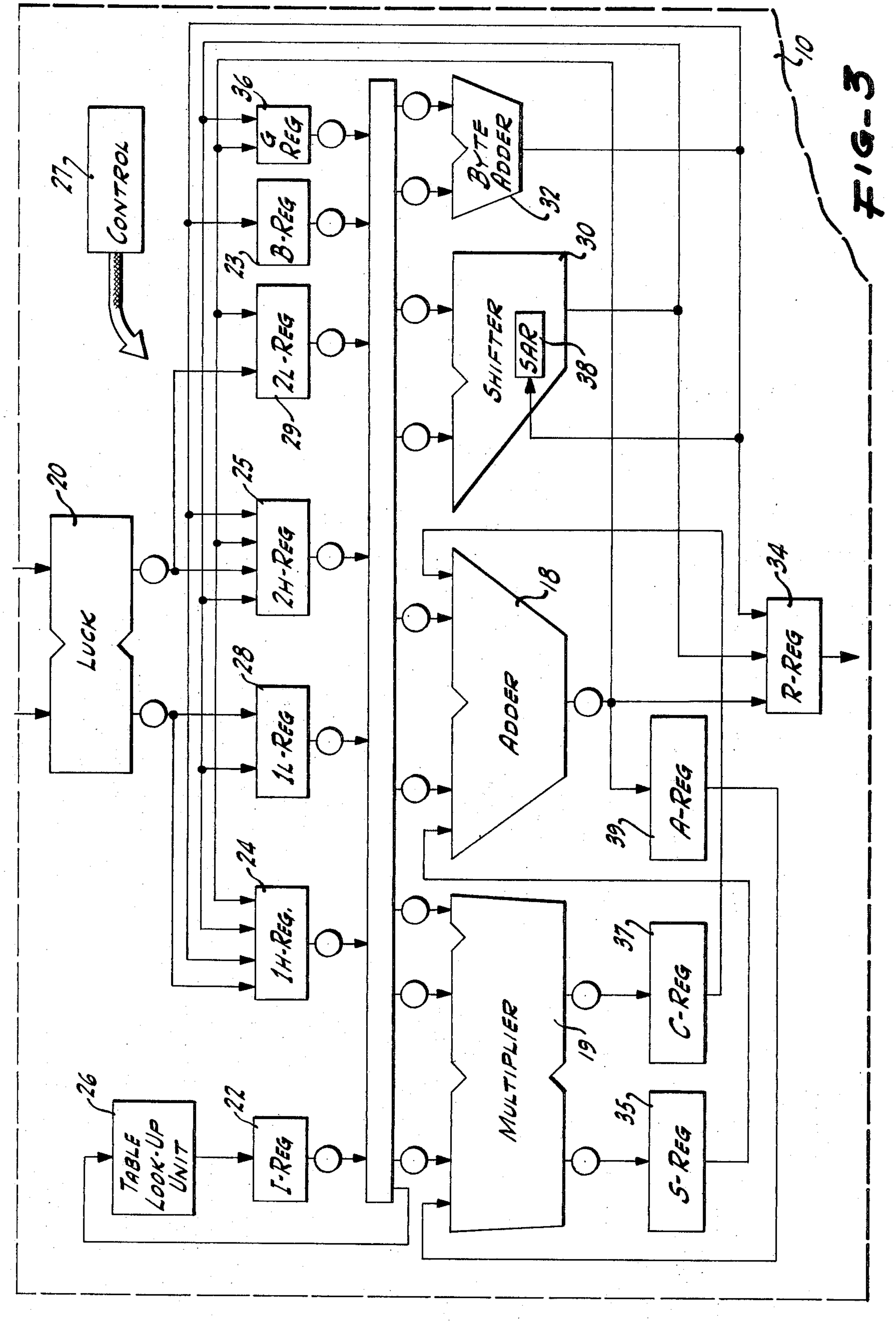
FIG. 3 depicts a schematic representation of the data paths and apparatus associated with the execution unit of the system of FIG. 1 which carries out the method steps of FIG. 2.

In FIG. 3, the execution unit 10 of the system of FIG. 1 is shown in further detail. The execution unit has a plurality of functional units including a multiplier 19, an adder 18, a shifter 30, a byte adder 32 and a LUCK unit 20 for performing logical and comparison operations. Those functional units are typically implemented using apparatus and techniques well known in the data processing field. In addition to the functional units, the execution unit 10 includes a plurality of registers which function to store, to ingate and to outgate data from the various functional units in controlled steps pursuant to executing the programmed instructions of the data processing system of FIG. 1. Specifically, those registers are an I register 22, a 1H register 24, a 1L register 28, a 2H register 25, a 2L register 29, a B register 23, a G register 36, an S register 35, a C register 37, an A register 39 and an R register 34.

Additionally, the E unit 10 also includes a control 27 which controls in a conventional manner the ingating, outgating and other timing associated with execution unit 10.

CONVERSION METHOD

A number Nx to the base $x$ is converted to an equivalent number Bz to the base $z$. Typically, $x$ is 2 representing the binary number system and $z$ is base 10 representing a binary coded decimal system.

The number Bz is formed of a plurality of digits Bz(i) which consists of Bz(1), Bz(2) , . . . , Bz(i), Bz($i$+1) , . . . , Bz($n$−1). Each of the digits Bz(i) can be one or more bits. For BCD, each digit is four binary bits or one hexadecimal digit.

The number Nx is defined, in the data processing system, to be greater than or equal to 0 and less than or equal to $z^v$ where $z$ is the base to which conversion is made and is some integer.

In the method of the present invention, a number Kx in the base $x$ is equal to $z^{-v}$. Further, a number Cx in the base $x$ is equal to $z^{+1}$.

The number Nx is multiplied by Kx forming the first digit Bz(0) and forming some remainder Yx(0) to the right of the marking point, as given by the following equation:

$$(Nx)\ (Kx) = Bz(\mathbf{0})\cdot Yx(\mathbf{0}) \quad \text{Eq. (1)}$$

The remainder Y(0) is multiplied by the constant value Cx to form the next digit Bz(1) and the remainder Yx(1) as follows:

$$(Cx)\ [Y(0)] = Bz(1)\cdot Yx(1) \quad \text{Eq. (2)}$$

The remainder Yx(1) is multiplied by the constant Cx to form Bz(2)·Yx(2) as follows:

$$(Cx)\ [Y(1)\ ] = Bz(2)\cdot Yx(2) \quad \text{Eq. (3)}$$

The iteration continues multiplying each new remainder Yx(i) by Cx to form each new result $Bx(i+1)\cdot Yx(i+1)$ as indicated generally as follows:

$$(Cx)\ [Y(i)\ ] = Bz(i+1)\cdot Yx(i+1) \quad \text{Eq. (4)}$$

The desired converted number Bz is Bz(0), Bz(1), . . . , Bz(i), $Bz(i+1)$, . . . , $Bz(n-1)$.

BINARY TO BINARY-CODED-DECIMAL CONVERSION

In a specific example of the above method, the base $x$ is 2 so that $Nx$ represents a binary number and the base $z$ is 10 so that the number Bz is an equivalent binary coded decimal number.

For the data processing system of FIG. 1, numbers Nx are typically represented within 32 binary bits so that the value of $z^v$ is $10^9$. Accordingly, in the base $x$ the value of Kx equals $10^{-9}$ in the base 10 which in hexadecimal format is 44B82FA1. Similarly, the value of Cx in the base $x$ is $10^{+1}$ in the base 10 which is A in hexadecimal format.

For a binary to binary-coded-decimal conversion in accordance with the method discussed above, the number Nx is multiplied by 44B82FA1 to form the first digit Bz(0) and a remainder Yx(0). Thereafter, each remainder Yx(i) is multiplied by A which is the hexadecimal representation of 10 in the base 10.

For a specific example of the method of the present invention implemented in a binary to binary-coded-decimal conversion the number Nx in hexadecimal format is 0000FA67. The binary coded decimal number Bx given in decimal format is 000064103. The steps employed to form the number Bx from the number Nx are given in the following TABLE I where the numbers are in hexadecimal format and represent the binary arithmetic performed by the data processing system.

TABLE I

STEP 0

$(Nx)\ (Kx) = Bz(0)\cdot Yx(0) = 0.0004337849E63C7$ $Bz(0) = 0$ $Yx(0) = 0.0004337849E$

STEP 1

$[Yx(0)\ ]\ [Cx] = Bz(1)\cdot Yx(1)$ $= 0.002A02C2E2C$ $Bz(1) = 0$ $Yx(1) = 0.002A02C2E2C$

STEP 2

$[Yx(1)\ ]\ (Cx) = Bz(Z)\cdot Yx(Z)$ $Bz(2) = 0$ $Yx(2) = 0.01A41B9CE$

STEP 3

$[Yx(2)\ ]\ (Cx) = Bz(3)\cdot Yx(3)$ $Bz(3) = 0$ $Yx(3) = 0.10691421$

STEP 4

$[Yx(3)\ ]\ (Cx) = Bz(4)\cdot Yx(4)$ $Bz(4) = 0$ $Yx(4) = 0.A41AC954$

STEP 5

$[Yx(4)\ ]\ (Cx) = Bz(5)\cdot Yx(5)$ $B(5) = 6$ $Y(5) = 0.690BDDD4$

STEP 6

$[Yx(5)\ ]\ (Cx) = Bz(6)\cdot Yx(6)$ $Bz(6) = 4$ $Yx(6) = 0.1A76A4DO$

STEP 7

$[Yx(6)\ ]\ (Cx) = Bz(7)\cdot Yx(7)$ $Bz(7) = 1$ $Yx(7) = 0.D8A27020$

STEP 8

$[Yx(7)\ ]\ (Cx) = Bz(8)\cdot Yx(8)$ $Bz(8) = 0$ $Yx(8) = 0.56586140$

STEP 9

$[Yx(8)\ ]\ (Cx) = Bz(9)\cdot Yx(9)$ $Bz(9) = 3$ $Yx(9) = 0.5F73CC80$

While the invention has been particularly shown and described with reference to a preferred embodiment thereof it will be understood by those skilled in the art that the foregoing and other changes in form and details may be made therein without departing from the spirit and scope of the invention.

We claim:

1. In a data processing system having a number $Nx$ in a number system to the base $x$ and having a plurality of functional units including a multiplier, an adder, a shifter, a logical comparator, a plurality of registers and control means for controlling the processing of operands by said functional units, the improvement comprising, means for gating said number $Nx$ to said multiplier, means for gating a number $Kx$ to said multiplier for multiplication by said number $Nx$ to form the product $Bz(0) \cdot Yx(0)$, means for sequentially gating the truncated remainders $Yx(i)$ to said multiplier, and means for repeatedly gating a number $Cx$ equal to $z^{+1}$ to said multiplier for multiplication by said truncated remainders $Yx(i)$ to iteratively form the products $Bz(i+1) \cdot Yx(i+1)$ for all values of $i$ between 0 and $(n-1)$.

2. In a data processing system having a binary number $Nx$ in a number system to the base $x$ where $x$ is 2 and where $Nx$ is in the range between 0 and $10^{+\nu}$ and having a plurality of functional units including a multiplier, an adder, a shifter, a logical comparator, a plurality of registers and control means for controlling the processing of operands by said functional units, the improvement for representing Nx as a binary-coded-number B2 comprising, means for gating said number Nx to said multiplier, means for gating a number Kx, equal to $10^{-\nu}$ in the number system to the base $x$, to said multiplier for multiplication by said number $Nx$ to form the product $Bz(0) \cdot Yx(0)$, where $Bz(0)$ is one digit of $Bz$ and $Yx(0)$ is the multiplication remainder after truncating $Bz(0)$, means for sequentially gating the truncated remainder $Yx(0)$ and for gating subsequent remainders $Yx(i)$ to said multiplier, and means for repeatedly gating a number $Cx$ equal 10 to said multiplier for multiplication by said truncated remainder $Yx(i)$ to iteratively form the products $Bz(i+1)$. $Yx(i+1)$ for all values of i between 0 and (n-1) thereby forming Bz with the digits $Bz(0)$, $Bz(1)$ , . . . , $Bz(n-1)$.

3. The system of claim 2 wherein each of said digit $Bz(i)$ is four bits and wherein $n$ equals 8.

4. In a data processing system having a number $Nx$ in a number system to the base $x$ and having a plurality of functional units including a multiplier, an adder, a shifter, a logical comparator, a plurality of registers and control means for controlling the processing of operands by said functional units, the improvement comprising, register means for electrically storing a number $Nx$, means for gating said stored number $Nx$ to said multiplier, register means for electrically storing a number $Kx$, means for gating said stored number $Kx$ to said multiplier for multiplication by said number $Nx$ to form the product $Bz(0) \cdot Yx(0)$, register means for electrically storing products from said multiplier, means for sequentially gating stored truncated remainders $Yx(i)$ to said multiplier for all values of $i$ between 0 and $(n-1)$, register means for electrically storing a number $Cx$, and means for repeatedly gating said stored number $Cx$ equal to $z^{+1}$ to said multiplier for multiplication by said truncated remainders $Yx(i)$ to iteratively form the products $Bz(i+1Yx.Yx(i+1)$ for all values of $i$ between 0 and $(n-1)$.

* * * * *

PO-1050
(5/69)

UNITED STATES PATENT OFFICE
CERTIFICATE OF CORRECTION

Patent No. 3,803,392 Dated April 9, 1974

Inventor(s) Gene M. Amdahl and Michael R. Clements

It is certified that error appears in the above-identified patent and that said Letters Patent are hereby corrected as shown below:

IN THE INVENTORS' NAME:

Cancel the name "Amdhal" and substitute therefor --Amdahl--.

IN THE ASSIGNEE'S ADDRESS:

Cancel the city "Sunnydale" and substitute therefor --Sunnyvale--.

IN THE CLAIMS:

Claim 4, column 6, line 35, cancel "Bz(i+1Yx.Yx(i+1)" and substitute therefor --Bz(i+1).Yx(i+1)--.

Signed and sealed this 15th day of October 1974.

(SEAL)
Attest:

McCOY M. GIBSON JR.
Attesting Officer

C. MARSHALL DANN
Commissioner of Patents